US008600676B2

(12) United States Patent
Hwang et al.

(10) Patent No.: US 8,600,676 B2
(45) Date of Patent: Dec. 3, 2013

(54) METHOD FOR FAST AND PRECISE ORBIT PROPOGATION INCLUDING MANEUVER

(75) Inventors: Yoo La Hwang, Daejeon (KR); Byoung Sun Lee, Daejeon (KR); Soo Jeon Lee, Daejeon (KR); Jae Hoon Kim, Daejeon (KR)

(73) Assignee: Electronics and Telcommunications Research Institute, Daejeon (KR)

( * ) Notice: Subject to any disclaimer, the term of this patent is extended or adjusted under 35 U.S.C. 154(b) by 82 days.

(21) Appl. No.: 13/334,988

(22) Filed: Dec. 22, 2011

(65) Prior Publication Data

US 2012/0166084 A1     Jun. 28, 2012

(30) Foreign Application Priority Data

Dec. 23, 2010   (KR) .................. 10-2010-0133067

(51) Int. Cl.
*G01C 21/24* (2006.01)

(52) U.S. Cl.
USPC .............................................. 701/531; 701/13

(58) Field of Classification Search
USPC ........................................ 701/13, 531
See application file for complete search history.

(56) References Cited

U.S. PATENT DOCUMENTS

| | | | |
|---|---|---|---|
| 5,687,084 A * | 11/1997 | Wertz ............................ | 701/13 |
| 5,862,495 A | 1/1999 | Small et al. | |
| 6,332,592 B1 * | 12/2001 | Longuski et al. ............ | 244/169 |
| 2002/0016172 A1 | 2/2002 | Kangras et al. | |
| 2012/0018586 A1 * | 1/2012 | Martinot et al. ........... | 244/158.6 |

* cited by examiner

*Primary Examiner* — Hussein A. Elchanti
(74) *Attorney, Agent, or Firm* — Staas & Halsey LLP

(57) ABSTRACT

A flight dynamics subsystem (FDS), a velocity increment calculation module, and operational methods of the same are provided. A used fuel quantity actually used in a satellite is calculated, and a velocity increment is calculated using the calculated fuel quantity. Therefore, an orbit of the satellite may be estimated more accurately.

4 Claims, 5 Drawing Sheets

METHOD FOR FAST AND PRECISE ORBIT PROPOGATION INCLUDING MANEUVER

CROSS-REFERENCE TO RELATED APPLICATION

This application claims the benefit of Korean Patent Application No. 10-2010-0133067, filed on Dec. 23, 2010, in the Korean Intellectual Property Office, the disclosure of which is incorporated herein by reference.

BACKGROUND

1. Field of the Invention

The present invention relates to a flight dynamics subsystem (FDS) and an operation method thereof, and more particularly, to an FDS for propagating an orbit of a satellite through calculation of a velocity increment.

2. Description of the Related Art

When a maneuver is included during determination and prediction of a satellite orbit, accuracy of estimating an initial orbit value using a velocity increment may be varied according to data length. When observation data is short, accurate estimation of the velocity increment and a satellite position becomes difficult since the observation data is insufficient for estimating the velocity increment. When a noise is serious, a noise error may be greater than the velocity increment. Therefore, it is difficult to determine and predict the orbit without an accurate velocity increment. A conventional orbit estimation method related to a maneuver applies the velocity increment predicted for a station-keeping maneuver plan directly to propagation of the orbit. However, since the predicted velocity increment may cause a large error in an actual maneuver, when only the predicted velocity increment is applied to propagation of the orbit, the propagation result may be inaccurate.

SUMMARY

An aspect of the present invention provides a flight dynamics subsystem (FDS) for predicting an orbit more accurately by estimating a difference between a fuel quantity planned for a station-maintaining maneuver of a satellite and an actual fuel quantity actually used in the satellite, and compensating a velocity increment planned for the station-maintaining maneuver using the estimated error.

According to an aspect of the present invention, there is provided a calculation module for calculating a velocity increment for determining and predicting an orbit of a satellite, the calculation module including a fuel quantity calculation unit to calculate a used fuel quantity about fuel used in the satellite based on TM data; and an error calculation unit to calculate an error with respect to a predicted velocity increment predicted for a station-maintaining maneuver of the satellite, based on a velocity increment with respect to the used fuel quantity and the predicted velocity increment.

According to another aspect of the present invention, there is provided an FDS including a receiving unit to receive ranging data, angle observation data, and TM data related to a satellite; a velocity increment calculation unit to calculate an error with respect to a velocity increment for determining and predicting an orbit of a satellite; and an orbit determination and prediction unit to determine and predict the orbit of the satellite based on the velocity increment included in the ranging data, the angle observation data, and the TM data, and to propagate the orbit of the satellite based on an orbit determination value related to the satellite and the error.

According to another aspect of the present invention, there is provided an operational method for a velocity increment calculation module that calculates a velocity increment for determining and predicting an orbit of a satellite, the operation method including calculating a used fuel quantity about fuel used in the satellite based on TM data; calculating an error with respect to a predicted velocity increment predicted for a station-keeping maneuver of the satellite, based on a velocity increment with respect to the used fuel quantity and the predicted velocity increment.

According to another aspect of the present invention, there is provided an operational method for an FDS, the operational method including receiving ranging data, angle observation data, and TM data related to a satellite; calculating an error with respect to a velocity increment for determining and predicting an orbit of the satellite, based on the TM data; determining and predicting the orbit of the satellite based on the velocity increment included in the ranging data, the angle observation data, and the TM data; and propagating the orbit of the satellite based on an orbit determination value related to the satellite and the error.

EFFECT

According to embodiments of the present invention, an error of a velocity increment planned for next station-maintaining maneuver is obtained using fuel quantity information, that is, information on a used fuel quantity related to fuel actually used in a satellite. In addition, the velocity increment is calculated using a fuel quantity calculated using accurate velocity increment information. As a result, an orbit of the satellite may be predicted more accurately.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
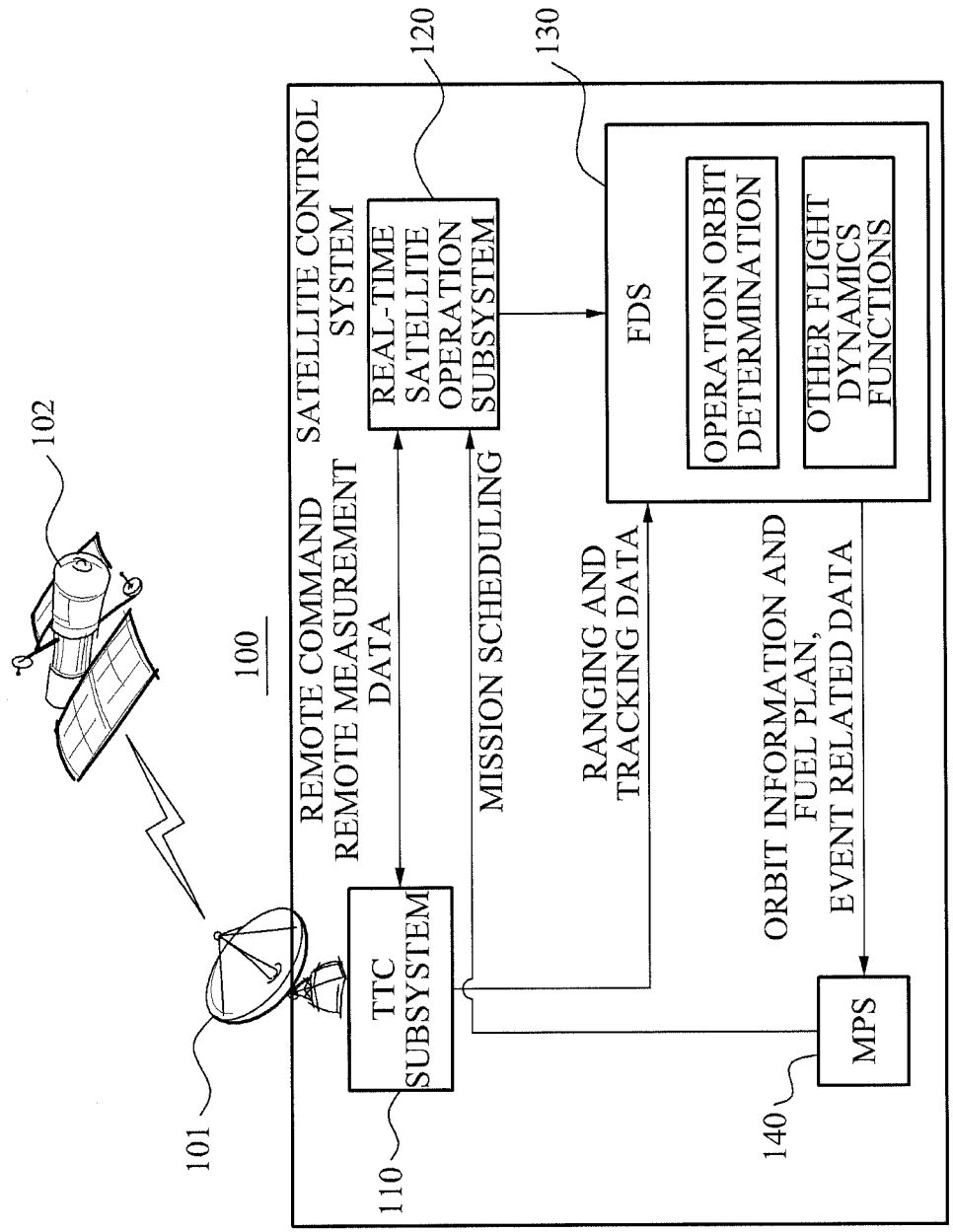
FIG. 1 is a diagram illustrating an inner structure of a satellite control system for a geostationary satellite, according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating an inner structure of a satellite control system 100 for a geostationary satellite, according to an embodiment of the present invention.

Referring to FIG. 1, the satellite control system 100 may include an antenna 101, a tracking, telemetry and command (TTC) subsystem 110, a real-time satellite operation subsystem 120, a flight dynamics subsystem (FDS) 130, and a mission planning subsystem (MPS) 140.

The satellite control system 100 may determine and predict an orbit of a satellite 102, using orbit observation data observed by ranging and tracking with respect to the satellite 102. Additionally, the satellite control system 100 may perform a station-maintaining maneuver so that the satellite 102, that is a geostationary satellite, stays within a section of a nominal orbit maintaining limit.

The TTC subsystem 110 may generate ranging data and angle observation data through ranging and tracking with respect to the satellite 102, receive telemetry data from the satellite 102 via the antenna 101, and transmit tele-command data to the satellite 102.

The real-time satellite operation subsystem 120 may perform direct operation of the satellite 102. The real-time satellite operation subsystem 120 may receive the telemetry data of the satellite 102 from the TTC subsystem 110, and process the received telemetry data so that an operator may check the telemetry data. In addition, the real-time satellite operation subsystem 120 may generate the tele-command data of the satellite 102 and transmit the tele-command data to the satellite 102 through the TTC subsystem 110. The real-time satellite operation subsystem 120 may transmit telemetry data related to flight dynamics, among the received telemetry data, to the FDS 130.

The FDS 130 may process various elements of flight dynamics data required for operation of the satellite 102, that is, the geostationary satellite. That is, the FDS 130 may process ranging data and angle observation data, thereby determining and predicting an operational orbit. Additionally, the FDS 130 may estimate or calculate a bias of observation data for accurate determination and prediction of the operational orbit.

The FDS 130 may perform determination and prediction of a real-time operational orbit using data received from the TTC subsystem 110 or determination and prediction of a post-processed operational orbit. Depending on embodiments, the FDS 130 may selectively perform determination and prediction of one of the real-time operational orbit and the post-processed operational orbit, based on a mission designed in regard to the satellite 102.

The FDS 130 may generate a dynamics model with respect to the satellite 102 to perform the orbit determination and prediction. In addition, the FDS 130 may design a filter for estimating the observation data.

The FDS 130 may select an estimation parameter with respect to the dynamics model or the observation data, and estimate a value of the selected estimation parameter.

The FDS 130 may calculate a velocity increment for the station-maintaining maneuver with respect to the satellite 102, and store the calculated velocity increment in a database (DB).

The FDS 130 may calculate a fuel quantity for performing a maneuver, by thruster modeling.

The MPS 140 may receive a request related a payload from operators of various payloads, and schedule a mission of the satellite 102 by connecting the received request with various events of the satellite 102. The MPS 140 may plan a remote command using a mission scheduling result and transmit the planned remote command to the real-time satellite operation subsystem 120.

Figure 2:
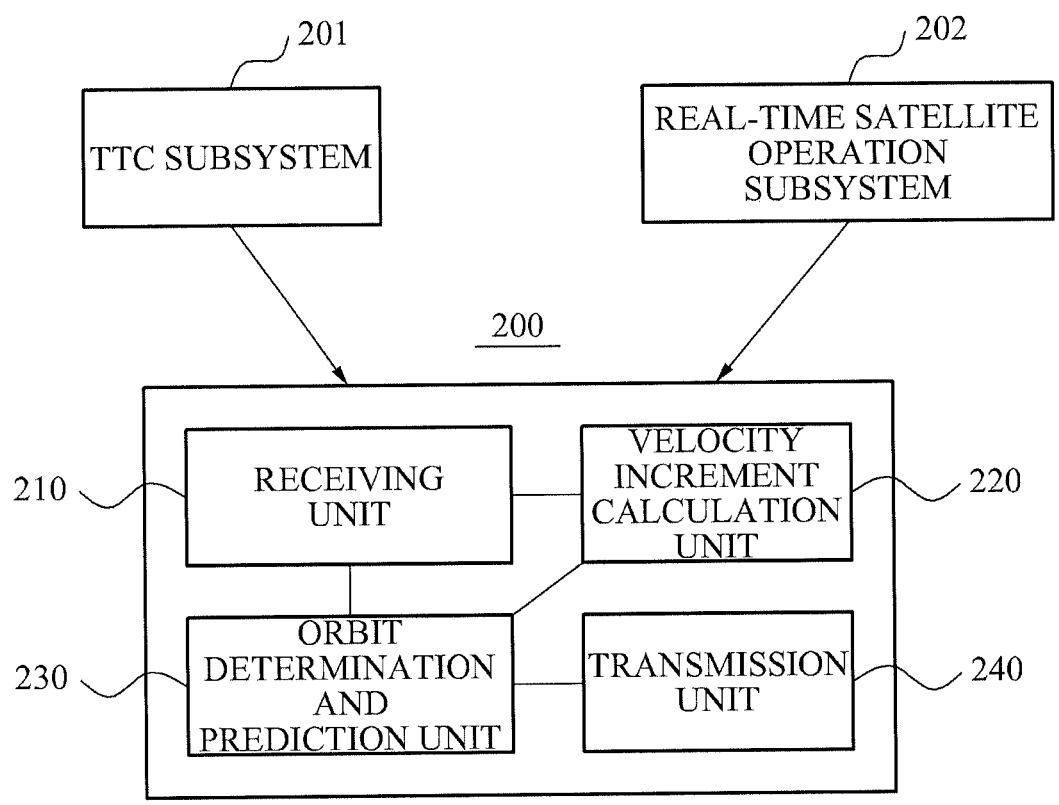
FIG. 2 is a diagram illustrating a structure of a flight dynamics subsystem (FDS) according to an embodiment of the present invention.

FIG. 2 is a diagram illustrating a structure of an FDS 200 according to an embodiment of the present invention.

Referring to FIG. 2, the FDS 200 may include a receiving unit 210, a velocity increment calculation unit 220, and an orbit determination and prediction unit 230.

The receiving unit 210 may receive ranging data and angle observation data related to a satellite from a TTC subsystem 201. In addition, the receiving unit 210 may receive TM data from a real-time satellite operation subsystem 202. Depending on embodiments, the receiving unit 210 may receive the TM data after the station-maintaining maneuver of the satellite is performed.

The velocity increment calculation unit 220 may calculate an error with respect to a velocity increment for determination and prediction of an orbit of the satellite, based on the TM data.

According to an aspect of the present invention, the velocity increment calculation unit 220 may calculate a used fuel quantity related to fuel used in the satellite, based on the TM data. Also, the velocity increment calculation unit 220 may calculate the error with respect to the velocity increment for determination and prediction of the orbit of the satellite, based on a velocity increment related to the used fuel quantity and a predicted velocity increment predicted for the station-keeping maneuver of the satellite.

The orbit determination and prediction unit 230 may determine and predict the orbit of the satellite based on the velocity increment included in the ranging data, the angle observation data, and the TM data. Also, the orbit determination and prediction unit 230 may propagate the orbit of the satellite based on an orbit determination value with respect to the satellite and the error.

According to another aspect of the present invention, the velocity increment calculation unit 220 may collect information on the velocity increment with respect to the used fuel quantity related to fuel used for a predetermined time, and on the predicted velocity increment predicted for station-keeping maneuver.

In addition, the velocity increment calculation unit 220 may generate pattern information related to the error, based on the collected information. Here, the orbit determination and prediction unit 230 may propagate the orbit of the satellite based on the pattern information. In addition, the orbit determination and prediction unit 230 may determine and predict the orbit based on the pattern information, by compensating the pattern information using the error of the velocity increment for station-maintaining maneuver.

The FDS 200 may further include a transmission unit 240.

The transmission unit 240 may transmit information on the orbit of the satellite to an external observation site.

Hereinafter, a velocity increment calculation unit of an FDS according to an embodiment of the present invention will be described in further detail with reference to FIG. 3.

Figure 3:
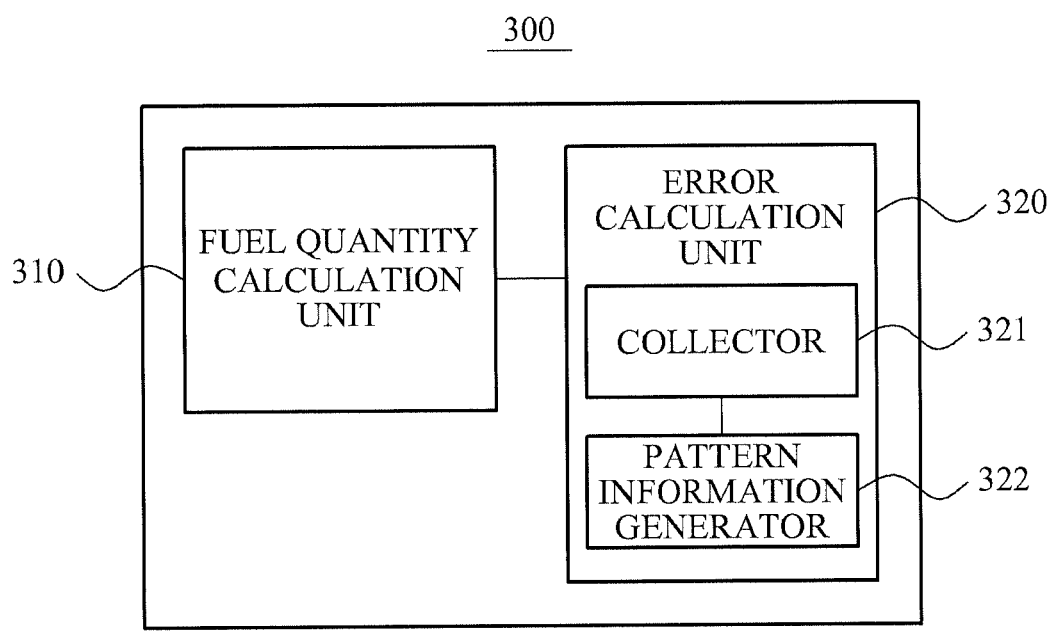
FIG. 3 is a diagram illustrating a velocity increment calculation module according to an embodiment of the present invention.

FIG. 3 is a diagram illustrating a velocity increment calculation module 300 according to an embodiment of the present invention.

Referring to FIG. 3, the velocity increment calculation module 300 may include a fuel quantity calculation unit 310 and an error calculation unit 320.

The velocity increment calculation module 300 may calculate a velocity increment for determination and prediction of an orbit of a satellite. The velocity increment calculation module 300 may be included in an FDS in the form of a module. In this case, the velocity increment calculation module 300 may be the velocity increment calculation unit illustrated in FIG. 2.

The error calculation unit 310 may calculate a used fuel quantity related to fuel used in the satellite, based on TM data.

The error calculation unit 320 may calculate an error with respect to a predicted velocity increment predicted for the station-maintaining maneuver of the satellite, based on a velocity increment with respect to the used fuel quantity and the predicted velocity increment.

According to an aspect of the present invention, the error calculation unit 320 may calculate the error by performing polynomial fitting that applies a least square method with respect to the velocity increment with respect to the used fuel quantity and the predicted velocity increment.

According to another aspect of the present invention, the error calculation unit 320 may calculate an error in a radial direction, an error in an in-track direction, and an error in a cross-track direction with respect to the predicted velocity increment, based on the velocity increment with respect to the used fuel quantity and the predicted velocity increment.

The error calculation unit 320 may calculate the error in the radial direction with respect to the predicted velocity increment, using Equation 1 below. In detail, the error calculation unit 320 may calculate the error in the radial direction by performing the polynomial fitting that applies the least square method, with respect to the velocity increment with respect to the used fuel quantity and the predicted velocity increment.

$$\begin{bmatrix} \Delta V_{r1} \\ \Delta V_{r2} \\ \vdots \\ \Delta V_{ri} \end{bmatrix} = \begin{bmatrix} \cdots x^2 & x & 1 \\ x^2 & x & 1 \\ \vdots & \vdots & \vdots \end{bmatrix} \begin{bmatrix} ar \\ br \\ \vdots \end{bmatrix}$$ [Equation 1]

In addition, the error calculation unit 320 may calculate the error in the in-track direction with respect to the predicted velocity increment, using Equation 2 below. In more detail, the error calculation unit 320 may calculate the error in the in-track direction by performing the polynomial fitting that applies the least square method, with respect to the velocity increment with respect to the used fuel quantity and the predicted velocity increment.

$$\begin{bmatrix} \Delta V_{I1} \\ \Delta V_{I2} \\ \vdots \\ \Delta V_{Ii} \end{bmatrix} = \begin{bmatrix} \cdots x^2 & x & 1 \\ x^2 & x & 1 \\ \vdots & \vdots & \vdots \end{bmatrix} \begin{bmatrix} aI \\ bI \\ \vdots \end{bmatrix}$$ [Equation 2]

In addition, the error calculation unit 320 may calculate the error in the cross-track direction with respect to the predicted velocity increment, using Equation 3 below. In detail, the error calculation unit 320 may calculate the error in the cross-track direction by performing the polynomial fitting that applies the least square method, with respect to the velocity increment with respect to the used fuel quantity and the predicted velocity increment.

$$\begin{bmatrix} \Delta V_{C1} \\ \Delta V_{C2} \\ \vdots \\ \Delta V_{Ci} \end{bmatrix} = \begin{bmatrix} \cdots x^2 & x & 1 \\ x^2 & x & 1 \\ \vdots & \vdots & \vdots \end{bmatrix} \begin{bmatrix} ac \\ bc \\ \vdots \end{bmatrix}$$ [Equation 3]

In Equations 1, 2, and 3, $\Delta V_r = V_{FA\_r} - V_{SK\_r}$, $\Delta V_I = V_{FA\_I} - V_{SK\_I}$, and $\Delta V_C = V_{FA\_C} - V_{SK\_C}$. Also, FA denotes a fuel account and SK denotes station-maintaining.

According to another aspect of the present invention, the error calculation unit 320 may include a collector 321 and a pattern information generator 322.

The collector 321 may collect information on the velocity increment with respect to the used fuel quantity related to fuel used for a predetermined time, and on the predicted velocity increment.

The pattern information generator 322 may generate pattern information related to the error, based on the collected information.

Figure 4:
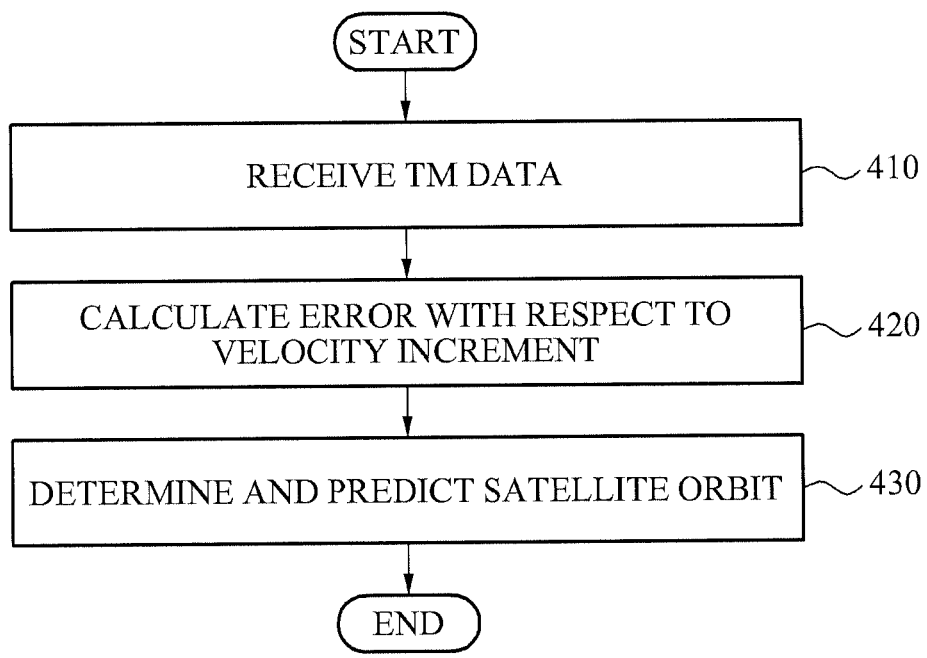
FIG. 4 is a flowchart illustrating an operational method for an FDS, according to an embodiment of the present invention.

FIG. 4 is a flowchart illustrating an operational method for an FDS, according to an embodiment of the present invention.

Referring to FIG. 4, the operational method receives ranging data and angle observation data related to a satellite from a TTC subsystem. Also, the operational method receives TM data from a real-time satellite operation subsystem in operation 410. Depending on embodiments, the operation method may receive the TM data after the station-maintaining maneuver of the satellite is performed.

In operation 420, the operational method may calculate an error with respect to a velocity increment for determining and predicting an orbit of the satellite, based on the TM data.

According to an aspect of the present invention, the operational method may calculate a used fuel quantity related to fuel used in the satellite, based on the TM data. Also, the operational method may calculate an error with respect to a predicted velocity increment predicted for the station-maintaining maneuver of the satellite, based on a velocity increment with respect to the used fuel quantity and the predicted velocity increment.

In operation 430, the operational method may determine and predict the orbit of the satellite based on the velocity increment included in the ranging data, the angle observation data, and the TM data. In addition, the operational method may propagate the orbit of the satellite based on an orbit determination value with respect to the satellite and the error.

According to another aspect of the present invention, the operational method may collect information on the velocity increment with respect to the used fuel quantity for a predetermined time and the predicted velocity increment.

In addition, the operational method may generate pattern information related to the error, based on the collected information. Here, the operational method may propagate the orbit of the satellite based on the pattern information. Furthermore, the operational method may determine and predict the orbit based on the pattern information, by balancing the pattern information using the error of the velocity increment for station-maintaining maneuver.

According to an aspect of the present invention, the operational method may transmit information on the orbit of the satellite to an external observation site.

Figure 5:
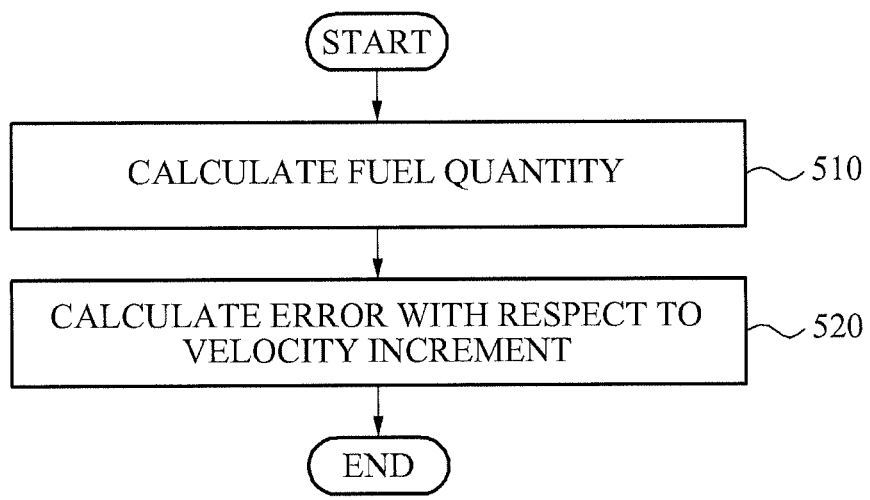
FIG. 5 is a flowchart illustrating an operational method for a velocity increment calculation module, according to an embodiment of the present invention.

FIG. 5 is a flowchart illustrating an operational method for a velocity increment calculation module, according to an embodiment of the present invention.

Referring to FIG. 5, in operation 510, the operational method calculates a fuel quantity used in the satellite based on TM data.

In operation 520, the operational method calculates an error with respect to a velocity increment predicted for a station-maintaining maneuver of the satellite, based on a velocity increment with respect to the used fuel quantity and the predicted velocity increment.

According to an aspect of the present invention, the operational method may calculate the error by performing the polynomial fitting that applies the least square method, with respect to the velocity increment, with respect to the used fuel quantity and the predicted velocity increment.

According to another aspect of the present invention, the operational method may calculate an error in a radial direction, an error in an in-track direction, and an error in a cross-track direction with respect to the predicted velocity increment, based on the velocity increment with respect to the used fuel quantity and the predicted velocity increment.

The operational method may calculate the error in the radial direction by performing the polynomial fitting that applies the least square method, with respect to the velocity increment with respect to the used fuel quantity and the predicted velocity increment.

The operational method may calculate the error in the in-track direction by performing the polynomial fitting that applies the least square method, with respect to the velocity increment with respect to the used fuel quantity and the predicted velocity increment.

The operational method may calculate the error in the cross-track direction by performing the polynomial fitting that applies the least square method, with respect to the velocity increment with respect to the used fuel quantity and the predicted velocity increment.

According to still another aspect of the present invention, the operational method may collect information on the velocity increment with respect to the used fuel quantity for a predetermined time and the predicted velocity increment. In addition, the operational method may generate pattern information related to the error based on the collected information.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A calculation module for calculating a velocity increment for determining and predicting an orbit of a satellite, the calculation module comprising:
   a fuel quantity calculation unit to calculate a used fuel quantity about fuel used in the satellite based on TM data; and
   an error calculation unit to calculate an error with respect to a predicted velocity increment predicted for a station-maintaining maneuver of the satellite, based on a velocity increment with respect to the used fuel quantity and the predicted velocity increment.

2. The calculation module of claim 1, wherein the error calculation unit calculates the error by performing polynomial fitting that applies a least square method with respect to the velocity increment with respect to the used fuel quantity and the predicted velocity increment.

3. The calculation module of claim 1, wherein the error calculation unit comprises:
   a collector to collect information on the velocity increment with respect to the used fuel quantity for a predetermined time and the predicted velocity increment; and
   a pattern information generator to generate pattern information related to the error based on the collected information.

4. The calculation module of claim 1, wherein the error calculation unit calculates an error in a radial direction, an error in an in-track direction, and an error in a cross-track direction with respect to the predicted velocity increment, based on the velocity increment with respect to the used fuel quantity and the predicted velocity increment predicted for the station-maintaining maneuver of the satellite.

* * * * *